(12) United States Patent
Zatezalo et al.

(10) Patent No.: US 7,052,799 B2
(45) Date of Patent: May 30, 2006

(54) WEARABLE TERMINAL WITH A BATTERY LATCH MECHANISM

(75) Inventors: Douglas Mark Zatezalo, Allison Park, PA (US); Mark Bradford Mellott, Pittsburgh, PA (US); Ryan Anthony Zoschg, Oakmont, PA (US); Michael Davis, White Oak, PA (US); Nicholas Barnes, London (GB); Graham Keith Lacy, London (GB); Ian Heseltine, London (GB)

(73) Assignee: Vocollect, Inc., Pittsburgh, PA (US)

( * ) Notice: Subject to any disclaimer, the term of this patent is extended or adjusted under 35 U.S.C. 154(b) by 353 days.

(21) Appl. No.: 10/185,334

(22) Filed: Jun. 27, 2002

(65) Prior Publication Data
US 2004/0001997 A1    Jan. 1, 2004

(51) Int. Cl.
*H01M 2/10* (2006.01)
*E05C 1/12* (2006.01)

(52) U.S. Cl. .......................... 429/97; 429/100; 429/96; 292/170

(58) Field of Classification Search ................. 429/99, 429/100, 97, 96, 181, 151, 159; 292/165, 292/169, 175, 145, 159, 170; 30/500; 227/8; 439/500, 624, 660; 320/112; 206/703, 704; 361/679
See application file for complete search history.

(56) References Cited

U.S. PATENT DOCUMENTS

| | | | |
|---|---|---|---|
| 3,969,796 A | 7/1976 | Hodsdon et al. ............... 24/270 |
| 4,031,295 A | 6/1977 | Rigazio ........................ 429/100 |
| 4,845,650 A | 7/1989 | Meade et al. ................ 364/708 |
| 5,023,824 A | 6/1991 | Chadima, Jr. et al. ....... 364/708 |
| 5,155,659 A | 10/1992 | Kunert ......................... 361/380 |
| 5,202,197 A | 4/1993 | Ansell et al. .................. 429/97 |
| 5,225,293 A | 7/1993 | Mitchell et al. ............... 429/97 |
| 5,251,105 A | 10/1993 | Kobayashi et al. ......... 361/683 |
| 5,267,181 A | 11/1993 | George ................... 364/709.12 |
| D344,494 S | 2/1994 | Cardenas ................... D14/100 |
| 5,305,244 A | 4/1994 | Newman et al. ......... 364/708.1 |
| 5,371,679 A | 12/1994 | Abe et al. .................... 364/468 |
| 5,479,001 A | 12/1995 | Kumar ........................ 235/472 |
| 5,491,651 A | 2/1996 | Janik ........................ 364/708.1 |
| 5,501,571 A | 3/1996 | Van Durrett et al. ........ 414/786 |
| 5,515,303 A | 5/1996 | Cargin, Jr. et al. ....... 364/708.1 |
| 5,535,437 A | 7/1996 | Karl et al. ..................... 455/90 |
| 5,555,490 A | 9/1996 | Carroll ......................... 361/686 |
| 5,572,401 A | 11/1996 | Carroll ......................... 361/683 |
| 5,581,492 A | 12/1996 | Janik ........................ 364/708.1 |
| 5,604,050 A | 2/1997 | Brunette et al. .............. 429/97 |
| 5,607,792 A | 3/1997 | Garcia et al. ................. 429/97 |
| 5,637,417 A | 6/1997 | Engmark et al. ............. 429/97 |
| 5,665,485 A | 9/1997 | Kuwayama et al. ........ 429/100 |
| D385,855 S | 11/1997 | Ronzani .................... D14/100 |
| D387,898 S | 12/1997 | Ronzani ....................... D3/215 |
| D390,552 S | 2/1998 | Ronzani .................... D14/124 |
| D391,234 S | 2/1998 | Chacon et al. ............. D14/100 |
| 5,719,743 A | 2/1998 | Jenkins et al. ............... 361/683 |
| 5,719,744 A | 2/1998 | Jenkins et al. ............... 361/683 |
| 5,757,339 A | 5/1998 | Williams et al. ................ 345/8 |
| 5,762,512 A | 6/1998 | Trant et al. ................... 439/347 |
| 5,766,794 A | 6/1998 | Brunette et al. .............. 429/97 |
| 5,787,361 A | 7/1998 | Chen .......................... 455/550 |
| 5,841,630 A | 11/1998 | Seto et al. .................. 361/683 |
| 5,844,824 A | 12/1998 | Newman et al. ......... 364/708.1 |
| 5,856,038 A | 1/1999 | Mason ......................... 429/97 |
| 5,857,148 A | 1/1999 | Weisshappel et al. ......... 455/90 |
| 5,869,204 A | 2/1999 | Kottke et al. ............... 429/100 |
| 5,895,729 A | 4/1999 | Phelps, III et al. ........... 429/97 |
| 5,905,632 A | 5/1999 | Seto et al. .................. 361/683 |
| D411,179 S | 6/1999 | Toyosato ................... D14/100 |
| 5,935,729 A * | 8/1999 | Mareno et al. ............. 429/100 |
| D413,582 S | 9/1999 | Tompkins .................. D14/100 |
| D414,470 S | 9/1999 | Chacon et al. ............. D14/100 |
| 6,051,334 A | 4/2000 | Tsurumaru et al. ........... 429/97 |
| D424,035 S | 5/2000 | Steiner et al. ............. D14/114 |
| 6,060,193 A | 5/2000 | Remes et al. ................. 429/96 |
| 6,071,640 A | 6/2000 | Robertson, Jr. et al. .... 429/100 |
| D430,158 S | 8/2000 | Bhatia et al. .............. D14/341 |
| D430,159 S | 8/2000 | Bhatia et al. .............. D14/341 |
| 6,114,625 A | 9/2000 | Hughes et al. ............. 174/52.1 |
| 6,120,932 A | 9/2000 | Slipy et al. .................. 429/99 |
| D431,562 S | 10/2000 | Bhatia et al. .............. D14/341 |
| 6,136,467 A | 10/2000 | Phelps, III et al. ........... 429/97 |
| 6,137,868 A | 10/2000 | Leach ........................ 361/732 |
| D434,762 S | 12/2000 | Ikenaga .................... D14/371 |
| 6,157,533 A | 12/2000 | Sallam et al. ............... 361/683 |
| 6,160,702 A | 12/2000 | Lee et al. ................... 361/683 |
| 6,167,413 A | 12/2000 | Daley, III .................. 708/139 |
| D436,104 S | 1/2001 | Bhatia et al. .............. D14/341 |
| 6,171,138 B1 | 1/2001 | Lefebvre et al. ............ 439/500 |

(Continued)

*Primary Examiner*—Raymond Alejandro
(74) *Attorney, Agent, or Firm*—Wood, Herron & Evans, L.L.P.

(57) ABSTRACT

A wearable, mobile and/or portable terminal for use in an inventory management system. The terminal includes a terminal housing, a battery pack removably receivable within an external battery-receiving cavity of the terminal housing, and a battery latching mechanism that secures the battery pack in the battery-receiving cavity in a latched condition. The battery pack has an unlatched condition in which the battery latch mechanism is disengaged from the battery pack. A camming surface of the battery latching mechanism lifts the unlatched battery pack from the battery-receiving cavity to promote its removal from the terminal housing. The terminal housing is sealed relative to the environment surrounding the wearable terminal battery pack and yet permits electrical coupling between the battery pack and the terminal in the latched condition.

10 Claims, 5 Drawing Sheets

U.S. PATENT DOCUMENTS

| | | |
|---|---|---|
| 6,179,192 B1 | 1/2001 | Weinger et al. ................. 227/8 |
| 6,190,795 B1 | 2/2001 | Daley ........................ 429/100 |
| D440,966 S | 4/2001 | Ronzani .................... D14/344 |
| 6,225,777 B1 | 5/2001 | Garcia et al. ............... 320/112 |
| 6,226,622 B1 | 5/2001 | Dabbiere ..................... 705/28 |
| 6,229,694 B1 | 5/2001 | Kono ........................ 361/683 |
| 6,235,420 B1 | 5/2001 | Ng ............................. 429/96 |
| 6,237,051 B1 | 5/2001 | Collins ....................... 710/36 |
| 6,261,715 B1 | 7/2001 | Nakamura et al. .......... 429/100 |
| 6,302,454 B1 | 10/2001 | Tsurumaru et al. ......... 292/175 |
| 6,304,430 B1 | 10/2001 | Laine et al. ................ 361/625 |
| 6,304,459 B1 | 10/2001 | Toyosato et al. ........... 361/861 |
| 6,310,888 B1 | 10/2001 | Hamlin ....................... 370/466 |
| 6,324,053 B1 | 11/2001 | Kamijo ...................... 361/683 |
| 6,326,543 B1 | 12/2001 | Lamp et al. ............... 174/52.1 |
| 6,327,152 B1 | 12/2001 | Saye .......................... 361/732 |
| 6,339,764 B1 | 1/2002 | Livesay et al. ............. 705/28 |
| 6,357,534 B1 | 3/2002 | Buetow et al. ............. 173/217 |
| 6,359,777 B1 | 3/2002 | Newman et al. ........... 361/683 |
| 6,371,535 B1 * | 4/2002 | Wei et al. .................... 292/175 |
| 6,373,693 B1 | 4/2002 | Seto et al. .................. 361/685 |
| 6,376,942 B1 | 4/2002 | Burger et al. ................ 310/47 |
| 6,511,770 B1 | 1/2003 | Chang ....................... 429/100 |
| 2001/0004310 A1 | 6/2001 | Kono |
| 2001/0036058 A1 | 11/2001 | Jenks et al. |
| 2001/0046305 A1 | 11/2001 | Muranami et al. |
| 2001/0048586 A1 | 12/2001 | Itou et al. |
| 2002/0012832 A1 | 1/2002 | White et al. |
| 2002/0025455 A1 | 2/2002 | Yoneyama |
| 2002/0034683 A1 | 3/2002 | Takeshita et al. |

* cited by examiner

WEARABLE TERMINAL WITH A BATTERY LATCH MECHANISM

FIELD OF THE INVENTION

This invention relates generally to wearable, portable and/or mobile computer terminals and peripherals.

BACKGROUND OF THE INVENTION

Wearable, portable and/or mobile computer terminals are used for a wide variety of tasks. Such terminals allow a worker using them to have mobility, while providing them with desirable computing and data-processing functions. Furthermore, various terminals provide a communication link to a larger, more centralized computer system. Such terminals are being implemented for an ever-increasing number of tasks.

One illustrative example of a specific use for a wearable or portable terminal is inventory management. Computerized inventory management systems are used in inventory-driven industries for various tasks, such as food and retail product distribution, manufacturing, and quality control. An overall integrated inventory management system involves a combination of a central computer for tracking and management, and the people who use and interface with the computer system in the form of order fillers, pickers and other workers. The workers handle the manual aspects of the integrated management system.

To provide an interface between the central computer system and the workers, wearable or portable terminals are used by the workers as they complete their numerous tasks. Such wearable terminals, for example, pull information directly from the central system and translate the information into voice or text commands for the workers. Through wireless RF networks, the commands to and responses from the workers are communicated between the system and the terminals. To communicate in a voice driven system, for example, the worker wears a headset which is coupled to their wearable terminal. Through the headset, the workers are able to receive voice instructions, ask questions, report the progress of their tasks, and report working conditions, such as inventory shortages, for example. Using such terminals, the work is done virtually hands-free without equipment to juggle or paperwork to carry around.

In addition to headsets, other peripherals are often coupled to the terminals depending upon the tasks to be performed. For example, bar code readers and other scanners may be utilized alone or in combination with a headset to communicate back and forth with the system.

An illustrative example of a job through a system utilizing wearable and/or portable terminals having voice capabilities may involve initially welcoming the worker to the system and defining a particular task or order, for example, a load to be filled for a certain truck to depart from a warehouse. The worker may then answer with a particular area (e.g., freezer) that they will be working in for that order. The system then vocally directs the worker to a particular aisle and bin to pick a particular quantity of an item. The worker then vocally confirms their location and the amount of items that are picked. The system may then direct them to a loading dock or bay for a particular truck to receive the order. As may be appreciated, various different scenarios might be played out through the system using a wearable terminal and attached peripherals.

The terminals are electronic devices which require a source of power. Therefore, they utilize a portable power source, such as a battery. During a shift, a worker may find that they must replace the battery in their terminal with a new one. This can be a tedious task. Often times a worker will have to stop what they are doing, remove the terminal from their belt or other securing device, disconnect the battery and install/connect a new battery. This usually requires two hands and is a significant disruption to the work schedule.

A further issue with portable batteries used with wearable and/or portable terminals is that they are susceptible to falling off or out of the terminal during use. As may be appreciated, wearable terminals are subject to rigorous use as the workers scramble around handling various tasks. The terminals are often bumped or otherwise abused in use.

In the past, batteries have tended to fall off when the terminals or the batteries were bumped. This might cause the battery or its casing to break, particularly on hard, concrete floors, and thereby result in further delays for the worker.

An additional concern with wearable terminals and also the power supplies therein, is their exposure to harsh environments which may affect their generation. Specifically, many work environments expose the terminals, and therefore the batteries, to moisture. Sometimes such moisture is direct, however, it is often in the form of condensation which may find a pathway into the electrical components of the terminal and also to the battery. For example, in food distribution, the terminals are exposed to the cold of a refrigerator or freezer environment, and then to the ambient warmth or heat and humidity of the rest of the facility. The moisture and condensation may cause electrical shorts and malfunctions in the terminal and in the batteries.

As such, it is desirable to improve upon the ruggedness of wearable terminals and their power sources. It is also desirable to improve the battery management procedures for active workers and reduce delays associated with power issues. It is further desirable to make workers more efficient and effective.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Although the invention will be described next in connection with certain embodiments, the invention is not limited to practice in any one specific type of wearable, portable and/or mobile terminal. It is contemplated that the principles of the invention can be used with a variety of electronic devices, including but not limited to wearable terminals for use with computerized inventory systems. The description of the invention is intended to cover all alternatives, modifications, and equivalent arrangements as may be included within the spirit and scope of the invention as defined by the appended claims. In particular, those skilled in the art will recognize that the components of the invention described herein could be arranged in multiple different ways.

Figure 1:
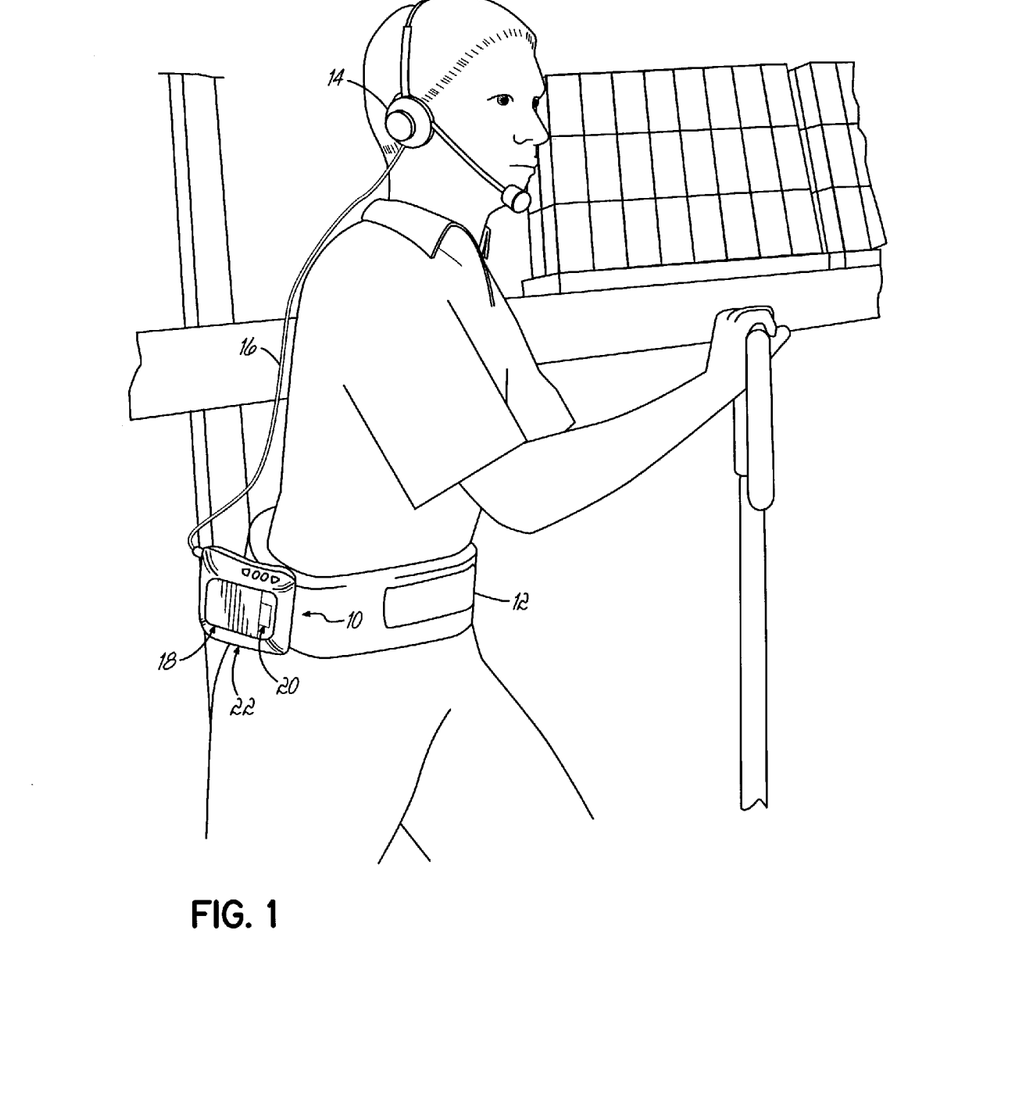
FIG. 1 is an illustration of a terminal constructed in accordance with the principles of the invention.

With reference to FIG. 1, a wearable, portable and/or mobile terminal 10 of the invention is worn by a worker on a belt 12 or is otherwise associated by another securing device associated with the worker's person. The terminal 10 is connected to at least one peripheral device 14, such as a headset or bar code reader, by a length of a cord 16 electrically coupled to the terminal 10. Such terminals 10 may be used, for example, in warehouse environments where workers are required to retrieve various items within the warehouse. An interior 17 of the terminal 10 houses electronics including a transceiver (not shown) that communicates with a remote central computer by transmitting and receiving information regarding the activities performed by the worker.

For use in a warehouse environment, the terminal 10 incorporates a removable battery pack 18 and a battery latch mechanism 20 for detachably securing the removable battery pack 18 to the terminal 10. The battery pack 18 supplies electrical power to the electronics of the terminal 10 so that the terminal 10 is wearable by the worker and is portable. As the battery pack 18 is powered and used in the warehouse environment, the electrical energy stored by the battery pack 18 is necessarily depleted until the battery capacity is expended. The battery capacity of the battery pack 18 may be replenished with a battery charger (not shown) having a power supply that can provide a supply of DC current.

Figure 2:
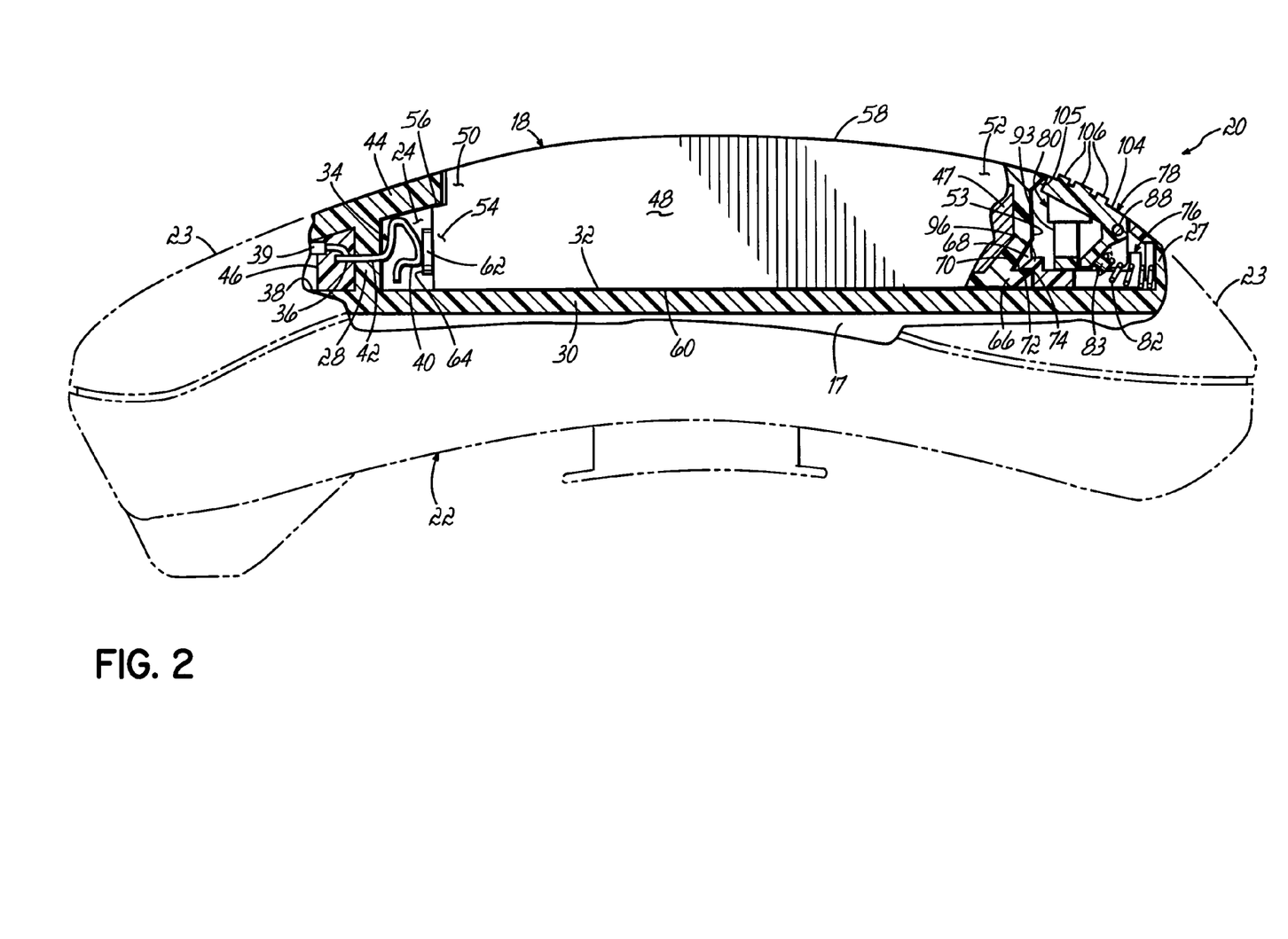
FIG. 2 is a partially-broken away side view of the terminal of FIG. 1 showing the battery pack in a latched condition.
Figures 5, 5A:
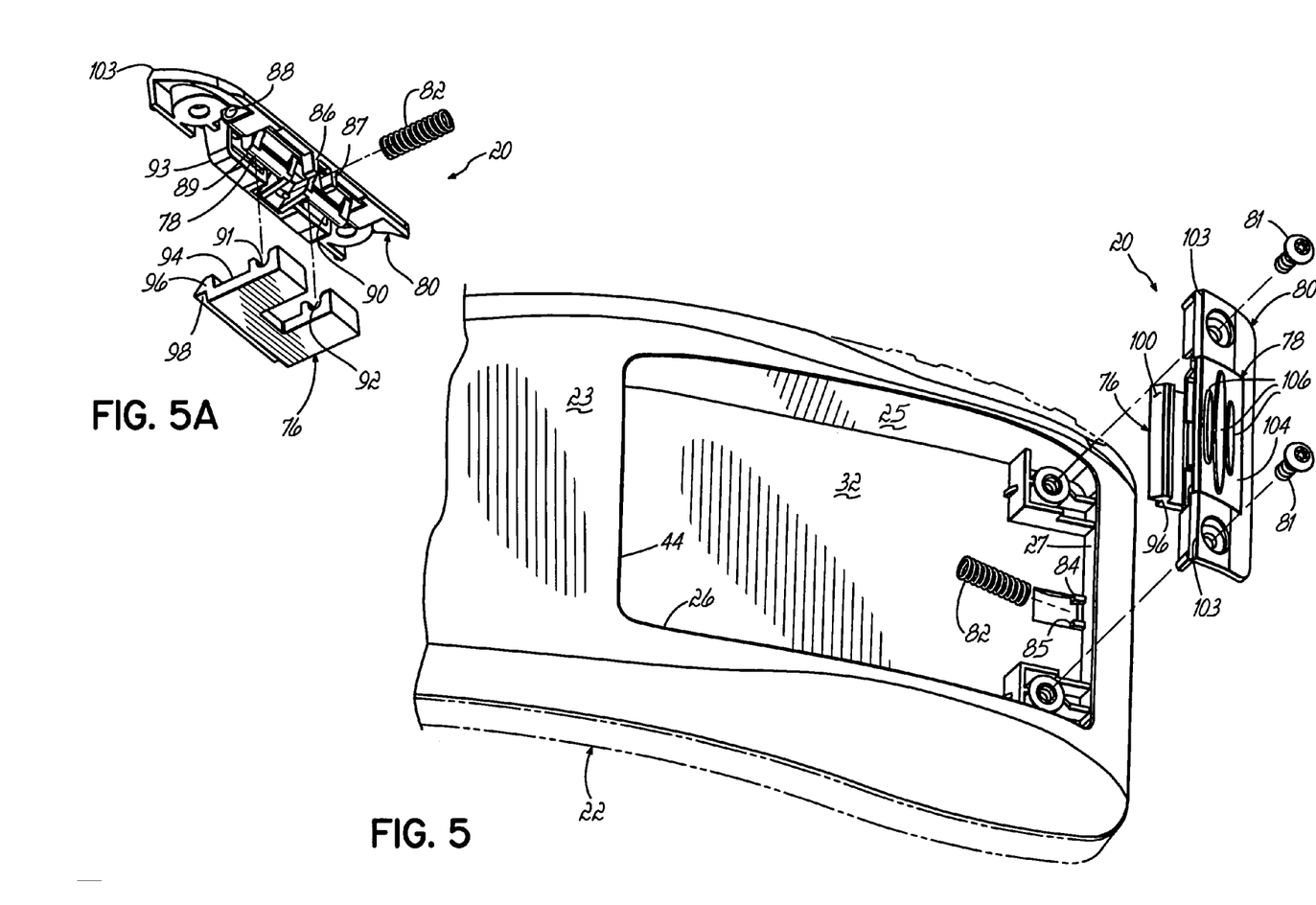
FIG. 5 is an exploded view of a portion of the terminal of FIG. 1 showing the assembly of the battery latch mechanism with the terminal housing.
FIG. 5A is an exploded view of the battery latch mechanism of the terminal of FIG. 1.

With reference to FIGS. 2 and 5, the terminal 10 includes a terminal housing 22 having a curved, convex outer surface 23 and a battery-receiving cavity 24 recessed below the outer surface 23. The battery-receiving cavity 24 is dimensioned to receive the battery pack 18 therein and provides a recessed void generally shaped like a cuboid or a parallelepiped that is external to the terminal housing 22. The terminal housing 22 includes a pair of opposing side walls 25, 26, a pair of opposing end walls 27, 28, and a base wall 30 having an outwardly-facing substantially planar, rectangular base surface 32 extending transversely between the side walls 25, 26 and longitudinally between the end walls 27, 28. The walls 25, 26, 27, 28 and 30 defined the boundaries of the battery-receiving cavity 24. End wall 28 separates a chamber 38 provided inside the terminal housing 22 from the battery-receiving cavity 24. The terminal housing 22 may be molded from a polymer resin. As used herein, inwardly and outwardly directions are referenced relative to the base surface 32 bounding the battery-receiving cavity 24. An outwardly direction is directed away from the base surface 32 and an inwardly direction is directed toward the base surface 32.

A plurality of spring-loaded electrical contacts 34, of which one electrical contact 34 is shown in FIG. 2, are located within the terminal housing 22 and positioned opposite to the location of the battery latch mechanism 20. Each electrical contact includes a tang portion 36 disposed within the chamber 38 and a spring finger 40 projecting into the battery-receiving cavity 24 from a corresponding one of multiple openings 42 penetrating end wall 28. Each spring finger 40 is resiliently deflectable by a force applied in a direction generally toward the end wall 28 with a concomitant storage of elastic energy. A lip portion 44 of the terminal housing 22 projects outwardly from end wall 28 over a portion of the battery-receiving cavity 24 so as to overhang the spring fingers 40. Each tang portion 36 is coupled electrically by an individual conductor 39 with the electronics housed within the terminal housing 22.

An encapsulant 46, such as an encapsulant selected from among the 1650 Series of encapsulants commercially available from Mereco Technologies Group (West Warwick, R.I.), is injected into the chamber 38 to secure the electrical contacts 34 in place and to prevent displacing of the electrical contacts 34 by the battery pack 18 relative to the battery-receiving cavity 24 back into the terminal housing 22. In one aspect of the invention, the encapsulant 46 also provides waterproofing and dustproofing so that the terminal 10 is sealed against the entry or infiltration of contaminants, including dust, moisture and other liquids, into the interior 17 of the terminal housing 22 through openings 42. The battery-receiving cavity 24 is accessible from the exterior of the terminal housing 22 for placement of the battery pack 18. As a result, the terminal housing 22 is sealed from the ambient environment of the terminal 10 and the battery pack 18 can be positioned within the battery-receiving cavity 24 without exposing the interior 17 of the terminal housing to the ambient environment. In addition, the sealed nature of the terminal housing 22 permits the terminal 10 to operate in ambient environments entailing exposure to condensation, moisture and other liquids without a significant risk of damage to the electronics housed inside the terminal housing 22.

In certain embodiments, the hermetic-sealing of terminal housing 22 may comply with the IP67 standard of the International Protection (IP) rating system which requires that the housing 22 be dust proof and that the housing 22 prevent the entry of water into the interior 17 if immersed in room temperature water to a depth of 1 meter for 30 minutes. The International Electrotechnical Commission standardizes classes of environmental protection for industrial equipment using the IP rating system.

With reference to FIG. 2, the battery pack 18 includes a sealed case 48, preferably molded from a polymer resin and shaped roughly like a parallelepiped or cuboid, and a battery cell 47, typically a lithium ion battery cell, housed within the sealed environment of the sealed case 48. The sealed case 48 is provided with a pair of opposing transverse ends 50, 52, a peripheral edge 53 at transverse end 52, a contact-containing portion 54 protruding outwardly from transverse end 50, and an outwardly-facing shoulder 56 formed by the contact-containing portion 54. A convex outwardly-facing surface 58 of the sealed case 48 has a curvature that conforms with the curvature of the outer surface 23 of the terminal housing 22 when the battery pack 18 is inserted in the battery-receiving cavity 24. An inwardly-facing planar surface 60 of the battery pack 18 provides a substantially abutting contact with the planar base surface 32 of the battery-receiving cavity 24 when the battery pack 18 is inserted into battery-receiving cavity 24.

A set of cylindrical conductive contacts 62, of which one electrical contact 62 is visible in FIG. 2, is disposed in the contact-containing portion 54 of the sealed case 48 of battery pack 18. Each of the conductive contacts 62 is terminated by a disk-shaped flat pad 64 facing outwardly from transverse end 50. The set of conductive contacts 62 participates in electrically coupling the battery cell with the electronics disposed within the terminal housing 22 of the terminal 10. To that end, each flat pad 64 of the battery pack 18 is electrically coupled with a corresponding one of the spring fingers 40 of the terminal 10. The physical contact between the flat pads 64 and spring fingers 40 is operative for supplying a good electrical contact adequate for transferring electrical current with minimal resistive loss. Upon engagement of the battery pack 18 within the battery-receiving cavity 24 in a latched condition, the terminal 10 operates via electrical power supplied from the battery cell of the battery pack 18.

The sealed case 48 of the battery pack 18 is sealed against the entry of moisture or other liquids. To that end, the sealed case 48 may be molded as multiple sections and subsequently joined by any suitable technique, such as ultrasonic welding, that provides a water-tight enclosure. The electrical contacts 62 provide the only external connections with battery cell 47 and have a liquid-tight seal with the corresponding openings in the contact-containing portion 54. For example, the electrical contacts 62 may be press-fit into the corresponding openings in the contact-containing portion 54 or the sealed case 48 may be molded about the electrical contacts 62.

In addition, the sealed case 48 of the battery pack 18 is free or any projecting elements, such as tabs or the like, that would otherwise cooperate with a latching mechanism. The absence of such projecting elements makes the battery pack 18 less prone to damage from, for example, being dropped onto a hard surface that would prevent positive engagement with terminal 10. As a result, the battery pack 18 is sturdy and robust because the battery-receiving cavity 24 that provides the positive engagement with the battery latch mechanism 20 is not susceptible to damage that would result in an inability to mechanically couple the battery pack 18 with the terminal 10.

With continued reference to FIG. 2, the peripheral edge 53 of sealed case 48 further includes a lip 66 and a latch cavity 68 with an entrance or opening therein oriented for engagement with the battery latch mechanism 20 when the battery pack 18 is inserted into the battery-receiving cavity 24. The lip 66 and latch cavity 68 extend transversely into and out of the plane of the page of FIG. 2. The latch cavity 68 has a triangular cross-sectional profile in a transverse direction. The lip 66 includes an outwardly-facing planar surface 70 that defines a lower surface of the latch cavity 68 and an inwardly-facing inclined camming surface 72 of the lip 66 oriented downwardly toward the base wall 30 of the battery-receiving cavity 24 when the battery pack 18 is inserted into the battery-receiving cavity 24. The inclined camming surface 72 is coextensive with the planar surface 70 along a shared transverse edge 74.

With reference to FIGS. 2, 5 and 5A, the battery latch mechanism 20 is positioned within the battery-receiving cavity 24 and proximate to end wall 27. The battery latch mechanism 20 is actuatable between to provide a latched condition in which the battery pack 18 is secured within the battery-receiving cavity 24 and an latched condition in which the battery pack 18 is readily removable from the battery-receiving cavity 24. The battery latch mechanism 20 includes a latching member 76 movable between an extended position (FIGS. 2 and 4) and a retracted position (FIG. 3), an actuator or release button 78 depressible to cause the latching member 76 to move between the extended and retracted positions, and a bracket member 80 pivotally coupling the release button 78 with the terminal housing 22 of the terminal 10. The bracket member 80 of the battery latch mechanism 20 is secured to the terminal housing 22 with conventional fasteners 81 or the like.

The latching member 76, the release button 78, and the bracket member 80 may be molded from a polymer resin. In particular, the release button 78 and the bracket member 80 may be molded from any polymer resin having good low temperature characteristics useful when the terminal 10 is exposed to a low temperature ambient environment. For example, the release button 78 and the bracket member 80 may be formed from a mixture of polycarbonate with either polybutylene terephthalate (PBT) or polyethylene terephthalate (PET), such as the family of such polymer resins available commercially under the tradename XENOY® from GE Plastics (Seven Hills, Ohio).

With continued reference to FIGS. 2, 5 and 5A, a biasing member 82, such as a compression spring, urges or biases the latching member 76 to the extended position when the release button 78 is not depressed. One end of the biasing member 82 fits over a guide post 83 formed on the release button 78. An opposite end of the biasing member 82 abuts end wall 27 of the terminal housing 22. The biasing member 82 is constrained against lateral movement by a pair of transversely-spaced guides 84, 85 projecting outwardly from the base surface 32 and a pair of transversely-spaced prongs 86, 87 projecting inwardly from the bracket member 80. While the biasing member 82 is illustrated as a compression spring, the invention contemplates that other types of springs, plastic cantilevers, or elastic members may also be used for biasing the latching member 76 toward the extended position.

The release button 78 is pivotal relative to the bracket member 80 about a transverse axis of rotation defined by a transversely-spaced pair of pivot pins 88, of which one pivot pin 88 is shown, that also secure the release button 78 mechanically with the bracket member 80. A pair of transversely-spaced flanges 89, 90 are provided on the release button 78 and project inwardly toward the base surface 32. The transverse space between the flanges 89, 90 is dimensioned to receive therebetween the prongs 86, 87 of the bracket member 80. The flanges 89, 90 extend into a corresponding pair of transversely-oriented grooves 91, 92 provided on the latching member 76. When the release button 78 is depressed, the angular rotation of the release button 78 about the pivot pins 88 is converted by the engagement between the flanges 89, 90 and grooves 91, 92 into a longitudinal displacement of the latching member 76 that moves the latching member 76 toward the end wall 27 from the extended position to the retracted position. Similarly, when the latching member 76 is in the retracted position and the release button 78 is released, the angular rotation of the release button 78 in the opposite angular direction about the pivot pins 88 is converted into a longitudinal displacement of the latching member 78 away from the end wall 27 due to the engagement between the flanges 89, 90 and grooves 91, 92 and the restoring force supplied by the biasing member 82 so that the latching member 76 moves from the retracted position (FIG. 3) to the extended position (FIGS. 2 and 4).

An inwardly-projecting flange 93 provided on the release button 78 abuts an upwardly-facing surface of a transversely-oriented, outwardly-facing slot 94 provided in the latching member 76. Flange 93 has a longitudinally spaced relationship with flanges 89, 90. The latching member 76 is slidingly captured between the tip of the flange 93 and the base surface 32 so that the latching member 76 cannot cantilever outwardly relative to the engagement between the flanges 89, 90 and grooves 91, 92 during movement between the extended and retracted positions.

With continued reference to FIGS. 2, 5 and 5A, a battery-engaging element 96 projects from the latching member 76 toward the interior of the battery-receiving cavity 24 of the terminal 10. The battery-engaging element 96 has a planar surface 98 facing the base surface 32 of the battery-receiving cavity 24 and an inclined camming surface 100 positioned opposite to the planar surface 98. The battery-engaging element 96 is captured within the latch cavity 68 when the battery pack 18 is present in the battery-receiving cavity 24 and the latching member 76 is in the extended position (FIG. 2). In particular, the planar surface 98 of the battery-engaging element 96 contacts the planar surface 70 of the lip 66 for securing the battery pack 18 within the battery-receiving cavity 24 in the latched condition. The engagement between the planar surfaces 70, 98 prevents outward movement of the battery pack 18 relative to the terminal housing 22. When the latching member 76 is in the retracted position (FIG. 3), the battery-engaging element 96 is not captured within the latch cavity 68 and the battery pack 18 is movable within the battery-receiving cavity 24 due to the extension of the spring fingers 40 and the associated bias force applied again the flat pads 64. The peripheral edge 53 of the battery pack also pushed slightly upward out of the battery-receiving cavity 24. It is contemplated by the invention that additional springs, plastic cantilevers, or other elastic members may be used to apply motive force to the battery pack 18 in addition to, or instead of, the spring fingers 40.

The inclination angle of the inclined camming surface 100 of the battery-engaging element 96 is complementary to the inclination angle of the inclined camming surface 72 of the lip 66. The battery pack 18 is placed in the unlatched condition when the latching member 76 is fully in the extended position and the inclined camming surfaces 72, 100 are abutting. In the unlatched condition, the battery pack 18 is lifted by the engagement between the inclined camming surfaces 72, 100 and may be manually removed from the battery-receiving cavity 24. Manual removal is facilitated by the outward projection of an upper corner 102 of peripheral edge 53 of the battery pack 18 above the outer surface 23 of the terminal housing 22. The upper corner 102 is readily grasped by a worker for removal of the battery pack 18.

With continued reference to FIGS. 2, 5 and 5A, an outwardly-facing surface 104 of the release button 78 has a convex curvature that generally conforms with the convex curvatures of the outer surface 23 of the terminal housing 22 and the outwardly-facing surface 58 of the sealed case 48 of the battery pack 18. The portion of the terminal housing 22 surrounding the release button 78 operates as a guard to prevent inadvertent latching and unlatching from incidental contact with outwardly-facing surface 104. As a results, a worker is generally required to make a specific and deliberate effort to apply an inward force to pivot the release button 78 for unlatching the battery pack 18. This, therefore, reduces the likelihood of damage to the battery pack 18 from inadvertently falling out of the terminal housing 22.

Provided on the release button 78 is a set of finger grips 106 that reduce slippage with the worker's finger when the release button 78 is pressed to actuate the battery latch mechanism 20. The finger grips 106 project a short distance outwardly above the surface 104 of the release button 78 that is insufficient to allow inadvertent actuation of the release button 78 and insufficient to significantly interrupt the smooth, curved contour presented collectively by surfaces 23, 58, 104.

Figure 3:
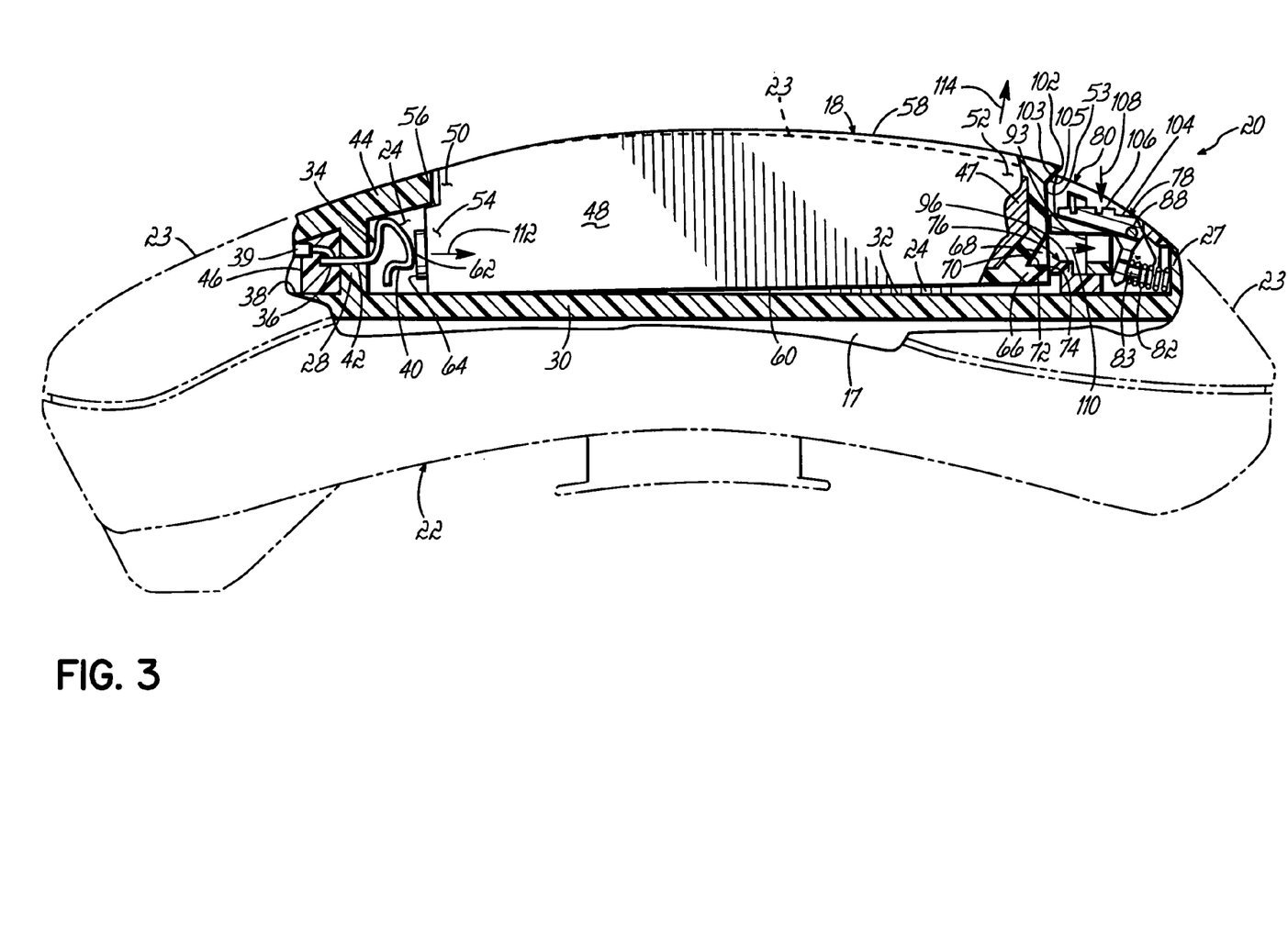
FIG. 3 is a partially-broken away side view of the terminal of FIG. 1 showing the battery pack in an intermediate condition.
Figure 4:
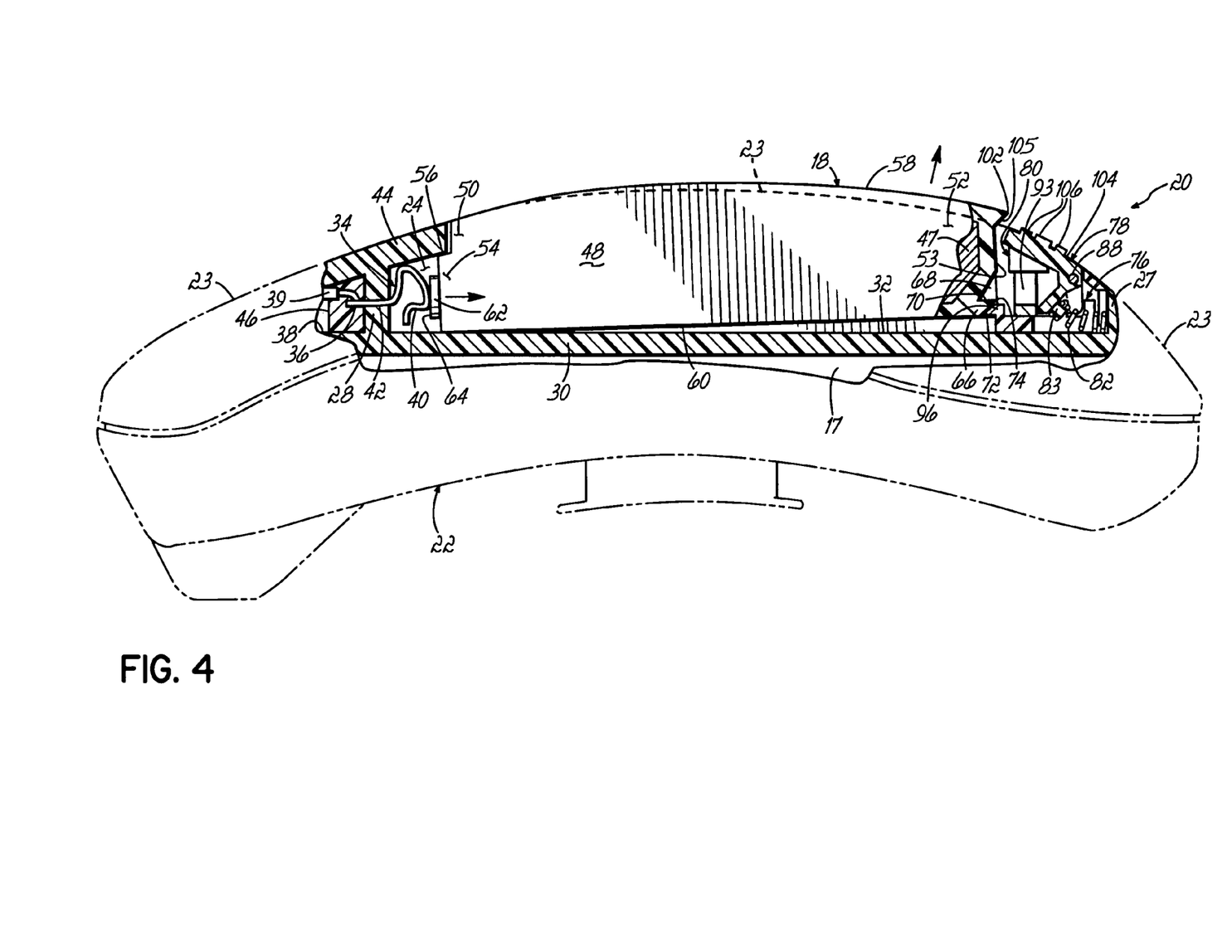
FIG. 4 is a partially-broken away side view of the terminal of FIG. 1 showing the battery pack in an unlatched condition.

In use and with reference to FIGS. 2–4, the battery pack 18 is initially in the latched condition shown in FIG. 2 with the battery-engaging element 96 of the latching member 76 engaged within the latch cavity 68 of the sealed case 48 of battery pack 18. To remove the battery pack 18 from the battery-receiving cavity 24, an inward force is applied to the release button 78 in a general direction indicated by arrow 108 in FIG. 3. The inward force causes the release button 78 to pivot about pivot pins 88 relative to the bracket member 80. The pivoting of the release button 78 displaces the latching member 76 toward wall 27 in a general direction indicated by arrow 110 in FIG. 3 due to the engagement between flanges 89, 90 and grooves 91, 92 from the extended position toward the retracted position. The biasing member 82 is compressed for applying a restoring force after the inward force applied to release button 78 is removed. When the latching member 76 is fully in the retracted position, the battery-engaging element 96 is released from the latch cavity 68 and the battery pack 18 is released for movement within the battery-receiving cavity 24.

The spring fingers 40 of the electrical contacts 34 collectively exert a lateral motive force against the battery pack 18 directed away from end wall 28. The lateral motive force displaces or moves the battery pack 18 toward the battery latch mechanism 20 in a direction indicated by arrow 112 in FIG. 3. As the battery pack 18 moves away from end wall 28, a camming surface 105 on the peripheral edge 53 of sealed case 48 engages a mating camming surface 103 on the terminal housing 22, causing the end of the battery pack 18 to elevate in a direction indicated by arrow 114 in FIG. 3 so that the corner 102 and end of the battery pack project above the outer surface 23 of the terminal housing 22 of the terminal housing 22 in the unlatched condition. The opposed end 50 of sealed case 48 remains captured between the lip portion 44 and base wall 30 of the terminal housing 22.

When the inward force applied to the release button 78 is removed as shown in FIG. 4, the restoring force applied by the biasing member 82 pivots the release button 78 to its initial position and the latching member 76 moves from the retracted position back toward the extended position. As a result, the inclined camming surface 100 of the latching member 76 slidingly engages the inclined camming surface 72 of the battery pack 18 and displaces or lifts the peripheral edge 53 of the battery pack 18 further outwardly relative to the battery-receiving cavity 24 in the general direction of arrow 114. As a result, the corner 102 of the peripheral edge 53 projects a distance above the contour of the outer surface 23 of the terminal housing 22 sufficient for removing the battery pack 18 from the battery-receiving cavity 24. The continued engagement between the inclined camming surfaces 72, 100, after the sliding relative movement therebetween ceases, holds the battery pack 18 in the unlatched condition in which the battery pack 18 can be easily disengaged from the battery-receiving cavity 24 and removed from the terminal 10 by single-handed manual manipulation. The hand of the worker is positioned to cradle the battery pack 18 during removal from terminal 10 so that the risk of dropping is reduced. The removal of the battery pack 18 may be accomplished with one hand and while the terminal 10 remains secured to belt 12.

The battery pack 18 is replaced by inserting the end 50 of the battery pack 18 into the battery-receiving cavity 24 so that the flat pads 64 contact the spring fingers 40 and the shoulder 56 of the battery pack 18 is captured between the lip portion 44 and base surface 32 of the terminal housing 22. An inward force applied to the sealed case 48 adjacent to end 52 toward the base surface 32 causes the latching member 76 to move from the extended position to the retracted position against the biasing force of the biasing member 82 by sliding contact between the inclined camming surfaces 72, 100. As the battery pack 18 is further pressed into the battery-receiving cavity 24, inclined camming surface 100 slides over transverse edge 74 and the latching member 76 is urged by the biasing member 82 away from the end wall 27 so that the battery-engaging element 96 protrudes into the latching cavity 68. Contact between planar surfaces 70, 98 provides a positive stop to place the battery pack 18 at the proper insertion depth in the battery-receiving cavity 24. When the battery pack 18 is thus completely inserted into the battery-receiving cavity 24, outward movement of the battery pack 18 is prevented and each of the flat pads 64 of the battery pack 18 is electrically coupled with a corresponding one of the spring fingers 40 of the terminal 10. The installation of the battery pack 18 may be accomplished with one hand and while the terminal 10 remains secured to belt 12. The battery pack 18 fits snugly in the battery-receiving cavity 24 so that movement of the battery pack 18 is restricted and the engagement between the spring fingers 40 and flat pads 64 is maintained as the terminal 10 is transported by the worker for use in the warehouse environment.

According to the principles of the invention, the battery pack can be quickly, easily, and effectively attached to the terminal and removed from the terminal. As a result, battery management procedures are simplified for active workers and delays associated with power issues are reduced. The principles of the invention improve worker efficiency and effectiveness. In addition, the principles of the invention act to ruggedize the terminal and battery pack so that operational lifetimes are lengthened.

The battery latch mechanism and battery pack of the invention cooperate to provide a desired combination of substantial resistance to inadvertent detachment from the terminal and efficient battery replacement. Specifically, the battery pack is not overly susceptible to falling off or out of the terminal during use because of the secure attachment to the terminal. Moreover, the small surface area of the outwardly-facing surface of the release button that makes the release button resistant to actuation by inadvertent applied forces. In addition, the conforming surface contours of the terminal housing, battery pack and release button reduce the likelihood that contact with an object will dislodge the battery pack from the battery-receiving cavity. As a result, delays in worker activities resulting from unintended separation of the battery pack from the terminal are reduced. In addition, the useful lifetime of the battery pack is extended because the battery pack is less likely to be inadvertently separated from the terminal and damaged by impact with, for example, a concrete floor.

The battery pack is removable from the battery-receiving cavity with a minimal applied force yet is retained with a sufficient retaining force, when the latch mechanism is initially actuated, so that the battery pack does not readily disengage from the terminal during an operation exchanging a depleted battery pack for a charged battery pack. The magnitude of the applied force required to separate the battery pack from the terminal, when the battery latch mechanism is disengaged from the battery pack, permits a worker to replace a depleted battery pack in a one-handed operation while the terminal remains attached to the worker. As a result, the tediousness entailed in the removal and replacement of the battery pack is significantly reduced by the improved ergonomics and the impact to the worker's work schedule is lessened.

According to the principles of the invention, the electronics within the terminal are isolated from exposure to harsh ambient operating environments in which the terminal is being used. In addition, the battery pack provides a sealed environment that isolates the battery cell from the infiltration of moisture and other contaminants from the operating environment or condensation arising from changes in the humidity level and temperature of the operating environment. As a result, the terminal and battery pack are significantly less susceptible to electrical shorts and malfunctions.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. An electronic device adapted to be powered by a battery pack having opposite first and second ends, comprising:
    a housing having a shallow external battery-receiving cavity configured to receive the battery pack;
    a battery latch mechanism having a slider configured to latch the battery pack in the battery-receiving cavity and configured to unlatch the battery pack for removing the battery pack from the battery-receiving cavity; and
    a spring-biased battery lifter arrangement including a battery-elevating camming surface at an interface between the housing and the first end of the battery pack and a spring biasing arrangement at a location of the second end of the battery pack which cooperates with the camming surface to cause the first end of the battery pack to elevate to an elevated state when the battery latch mechanism is unlatched, wherein the slider of the battery latch mechanism re-engages the battery pack while in the elevated state to at least assist in preventing the battery pack from falling back into the battery-receiving cavity.

2. The device of claim 1 wherein the spring biasing arrangement comprises electrical spring contacts.

3. The device of claim 2 wherein said housing includes a chamber proximate to said battery-receiving cavity, an end wall separating said chamber from said battery-receiving cavity, and said electrical contacts extend through a corresponding plurality of openings defined in said end wall.

4. The device of claim 1 wherein the slider is spring-biased and is mounted to reciprocate.

5. The electronic device of claim 1 wherein the slider is spring-biased and mounted to reciprocate.

6. The electronic device of claim 1 wherein the battery latch mechanism is mounted in the cavity, and the battery latch mechanism further includes a finger-depressible pushbutton coupled with the slider, the battery latch mechanism being configured such that depressing the pushbutton causes the slider to release the battery back and exposes the battery pack for quick and easy removal of the battery pack with the finger used to depress the pushbutton.

7. An electronic device adapted to be powered by a battery pack having opposite first and second ends, comprising:

a housing having an external battery-receiving cavity and a plurality of spring-loaded first electrical contacts positioned in said battery-receiving cavity;

a battery latch mechanism mounted proximate to said battery-receiving cavity;

a battery pack configured to be removably received within said battery-receiving cavity, said battery pack including a plurality of second electrical contacts and a peripheral edge adjacent to said battery latch mechanism, said latch mechanism and said battery pack having a latched condition in which said battery latch mechanism engages and secures said battery pack within said battery-receiving cavity and an unlatched condition, and said second electrical contacts being electrically coupled with said first electrical contacts when said battery pack is in the latched condition; and a battery lifter arrangement configured to elevate the first end of an installed battery pack adjacent the battery latch mechanism when the battery latch mechanism is unlatched, the battery lifter arrangement including a battery-elevating camming structure at an interface between the housing and a first end of the battery pack and a spring biasing arrangement at a location of the second end of the battery pack which cooperates with the camming structure to cause the first end of the battery pack to elevate when the battery latch mechanism is unlatched, wherein said battery latch mechanism includes a camming surface, and said first electrical contacts directing said peripheral edge of said battery pack to engage said camming surface in the unlatched condition, the engagement between said camming surface and said peripheral edge lifting said peripheral edge of said battery pack a distance sufficient for removing said battery pack from said battery-receiving cavity.

8. The device of claim 7 wherein the battery latch mechanism includes a reciprocating latching member for latchingly engaging and disengaging the battery pack while in the battery-receiving cavity, a release button configured to reciprocate the latching member and a spring captured between the housing and the release button to provide spring bias for both the release button and the reciprocating latching member.

9. An electronic device adapted to be powered by a battery pack having opposite first and second ends, comprising:

a housing having a shallow external battery-receiving cavity configured to receive the battery pack;

a battery latch mechanism including a slider and a pivotally mounted, finger-operable release button located on the housing adjacent the first end of the battery pack and in operable engagement with the slider, the slider being configured to latch the battery pack in the battery-receiving cavity and configured to unlatch the battery pack for removing the battery pack from the battery-receiving cavity; and a spring-biased battery lifter arrangement including a battery lifter arrangement configured to elevate a first end of the battery pack when the battery latch mechanism is unlatched, wherein the slider of the battery latch mechanism re-engages the battery pack while in the elevated state to at least assist in preventing the battery pack from falling back into the battery-receiving cavity, and the battery latch mechanism is configured such that a user can unlatch the battery pack by depressing the release button and with the same hand readily grasp the first end of the battery pack while the battery pack is in the elevated state.

10. An electronic device adapted to be powered by a battery pack having opposite first and second ends, comprising:

a housing having a shallow external battery-receiving cavity configured to receive the battery pack;

a battery latch mechanism including a slider, a release button pivotally mounted for rotary motion, a latching member configured for linear reciprocation, and a motion converter for converting rotary motion of the button to linear reciprocation of the latching member, the slider being configured to latch the battery pack in the battery-receiving cavity and configured to unlatch the battery pack for removing the battery pack from the battery-receiving cavity; and a spring-biased battery lifter arrangement including a battery lifter arrangement configured to elevate a first end of the battery pack when the battery latch mechanism is unlatched, wherein the slider of the battery latch mechanism re-engages the battery pack while in the elevated state to at least assist in preventing the battery pack from falling back into the battery-receiving cavity.

* * * * *

UNITED STATES PATENT AND TRADEMARK OFFICE
CERTIFICATE OF CORRECTION

| | |
|---|---|
| PATENT NO. | : 7,052,799 B2 |
| APPLICATION NO. | : 10/185334 |
| DATED | : May 30, 2006 |
| INVENTOR(S) | : Zatezalo et al. |

It is certified that error appears in the above-identified patent and that said Letters Patent is hereby corrected as shown below:

Column 3, line 49, reads "The walls 25, 26, 27, 28 and 30 defined the..." and should read -- The walls 25, 26, 27, 28 and 30 define the... --.

Column 5, line 23, reads "...free or any projecting elements, such as..." and should read -- ... free of any projecting elements, such as... --.

Column 5, line 54, reads "...mechanism 20 is actuatable between to provide a latched..." and should read -- ...mechanism 20 is actuatable to provide a latched... --.

Column 5, line 56, reads "...cavity 24 and an latched condition in..." and should read -- ...cavity 24 and an unlatched condition in... --.

Column 7, line 22, reads "...of the battery pack also pushed slightly upward out of the..." and should read -- ...of the battery pack also pushes slightly upward out of the... --.

Column 7, line 53, reads "outwardly-facing surface 104. As a results, a..." and should read -- ...outwardly-facing surface 104. As a result, a... --.

Column 8, lines 33-34, read "...the outer surface 23 of the terminal housing 22 of the terminal housing 22 in the unlatched condition." and should read -- ...the outer surface 23 of the terminal housing 22 in the unlatched condition. --.

Column 9, lines 44, reads "...surface of the release button that makes the..." and should read -- ...surface of the release button that makes the... --.

Column 10, line 4, reads "According the principles of the invention..." and should read -- According to the principles of the invention... --.

Signed and Sealed this
Fifteenth Day of February, 2011

David J. Kappos
*Director of the United States Patent and Trademark Office*

Column 11, line 40, CLAIM 8, reads "...reciprocate the latching member and a spring captured..." and should read -- ...reciprocate the latching member, and a spring captured... --.